United States Patent [19]

Brewer

[11] 4,009,896
[45] Mar. 1, 1977

[54] QUICK CONNECT COUPLING

[75] Inventor: Robert W. Brewer, Dayton, Ohio

[73] Assignee: General Motors Corporation, Detroit, Mich.

[22] Filed: May 10, 1976

[21] Appl. No.: 685,042

[52] U.S. Cl. .............................. 285/305; 285/332; 285/423

[51] Int. Cl.² ......................................... F16L 37/00

[58] Field of Search .......... 285/305, 332, 353, 356, 285/321, 354, 348, 423

[56] References Cited

UNITED STATES PATENTS

| | | | |
|---|---|---|---|
| 1,874,918 | 8/1932 | Davis | 285/332 X |
| 2,497,441 | 2/1950 | Detweiler | 285/348 X |
| 2,499,024 | 2/1950 | Hollyday | 285/348 X |
| 2,560,263 | 7/1951 | Wiegond et al. | 285/356 X |
| 2,983,506 | 5/1961 | Bertsch et al. | 285/356 X |
| 3,314,696 | 4/1967 | Ferguson et al. | 285/321 X |
| 3,453,005 | 7/1969 | Foults | 285/321 X |
| 3,929,357 | 12/1975 | DeVincent | 285/319 |

Primary Examiner—Dave W. Arola
Attorney, Agent, or Firm—Arthur N. Krein

[57] ABSTRACT

A quick connect coupling includes a connector with a countersunk bored opening therethrough, the countersunk opening providing a recessed enlarged cavity at one end of the connector and forming an annular male plug that extends into the cavity, a plastic tube extends through the bore of the connector and is provided with an annular upset bead on its inboard end that is positioned axially outboard of the annular male plug within the cavity, the connector being adapted to be pushed into assembled relation with an adapter having a stepped bore therethrough providing a socket opening at one end thereof of a size to receive the annular upset bead end of the tube and to slidably receive the annular plug of the connector, the socket at its inboard end terminating at a frusto-conical seal seat for engagement with the outboard tapered end surface of the annular upset bead of the tube, an O-ring seal being positioned to encircle the tube between its annular upset bead and the free end of the plug whereby to engage the annular inner surface of the socket of the adapter to provide another seal in the coupling assembly, the connector and the adapter containing aligned notches, when the connector is assembled to the adapter, to receive a spring clip used to releasably retain these coupling elements in their assembled relation.

2 Claims, 5 Drawing Figures

QUICK CONNECT COUPLING

This invention relates to a conduit coupling and, in particular, to a quick connect coupling.

Numerous types of quick connect couplings are known and, many of these couplings also have means associated therewith to provide for quick release. However, the known prior art quick connect type couplings have all been used to effect the fluid coupling of rigid tubular conduit elements in the actual coupling, these tubular conduit elements being in the form of metal pipes or tubes or a rigidly secured hose element, but none of the known quick connect couplings are operative to effect the fluid coupling of a relatively pliable or flexible conduit, such as a small diameter plastic tube.

It is therefore the primary object of this invention to provide an improved quick connect coupling to effect fluid coupling of a flexible plastic tube.

Another object of this invention is to provide a push on - quick disconnect coupling adapted for use with a tube made of a plastic material, such as Nylon.

A further object of this invention is to provide a simple and reliable snap ring coupling for the quick connecting of a tube, such as a relative flexible tube, to a fluid line.

These and other objects of the invention are obtained by means of a quick connect coupling for fluid connection of a tube to a fluid circuit, the tube extending through a connector that includes an annular plug and an integral attachment collar concentric therewith, with the tube being provided with an annular upset bead at an end thereof which is positioned axially outboard of the free end of the annular plug and enclosed by the attachment collar, the annular plug and upset bead of the tube being slidably received in the socket end of an apertured fluid line adapter, with the collar of the connector encircling the adapter when the annular plug is fully inserted therein, the collar of the connector being provided with diametrically opposed slots therethrough to receive the side legs of a spring retainer whereby these legs of the spring extend radially inward of the collar in position to engage into an annular groove on the outer periphery of the adapter when the connector is fully plugged into the adapter whereby to releasably retain these elements in their assembled relation.

For a better understanding of the invention, as well as other objects and further features thereof, reference is had to the following detailed description of the invention to be read in connection with the accompanying drawings, wherein.

Figure 1:
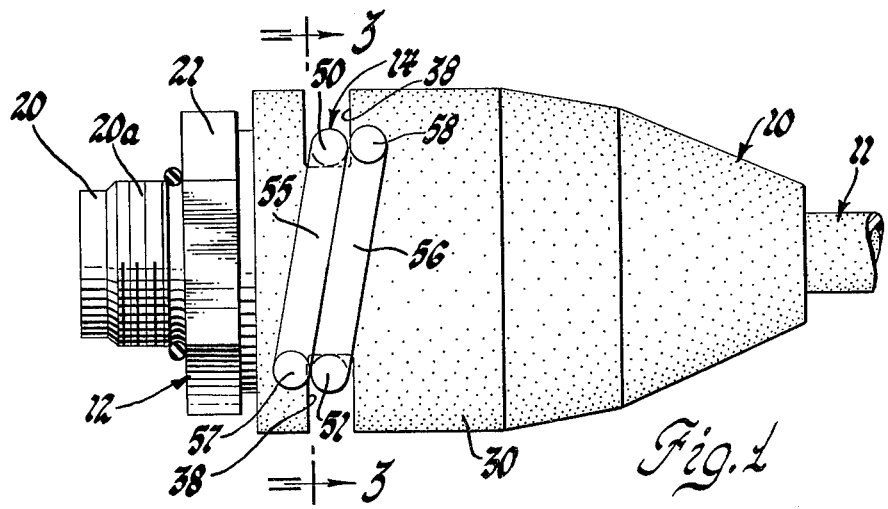
FIG. 1 is a side view of one embodiment of a quick connect coupling, in accordance with the invention, with the elements of this assembly being illustrated in their coupled and locked together positions relative to each other.
Figure 2:
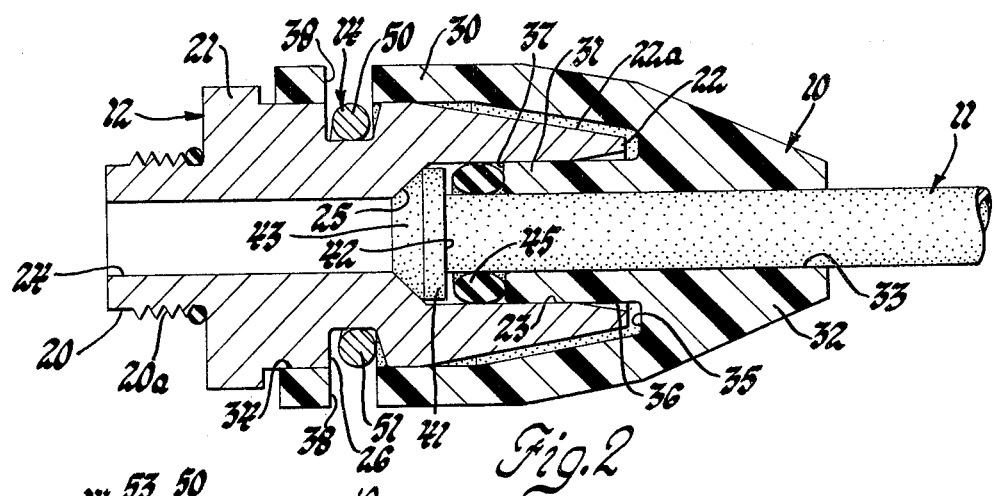
FIG. 2 is a longitudinal, sectional view of the quick connect coupling of FIG. 1 taken along the axis of the coupling.
Figure 3:
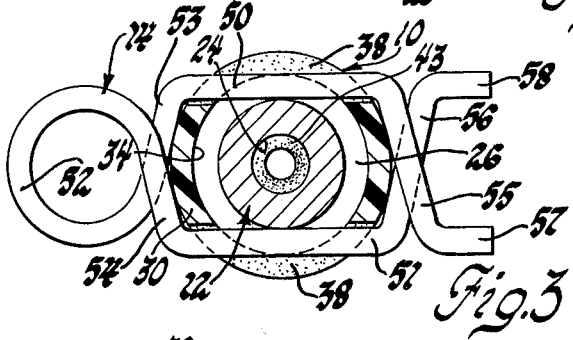
FIG. 3 is a sectional view of the quick connect coupling of FIG. 1 taken along line 3—3 of FIG. 1.

Referring now to the drawings and, in particular, to FIGS. 1, 2 and 3, the quick connect coupling of the invention includes a plug member or connector 10 for connecting a fluid conduit in the form of a tube 11 to a socket member or fluid line adaptor 12 in a fluid line, a plug portion of the connector 10 being adapted to be pushed into the socket end of the adapter 12 whereby the tube 11 is in fluid coupled assembly therewith and, a spring retainer 14 is used to releasably retain this coupled assembly.

Referring first to the fluid line adapter 12, it may, if desired, be formed as an integral part of another mechanism, for example as the inlet or outlet of a pump or compressor, or as shown, it may be formed as a separate element for attachment in a known manner to such a pump or compressor. For example, in the structure illustrated, the adapter 12, of tubular configuration, is provided with a reduced diameter shank portion 20 at one end thereof next adjacent a wrenching head 21, the shank portion 20 being provided with threads 20a formed thereon whereby the adapter can be threadedly connected, for example, to a pump or compressor. The wrenching head 21 is provided with suitable wrenching flats on its outer periphery, a hex head being illustrated in the construction shown.

The adapter 12 is provided with a stepped bore therethrough which forms in succession, starting at a socket end 22 thereof, that is the end opposite the threaded reduced diameter portion 20, an inner first annular wall 23 of a predetermined diameter and axial length to define a socket opening and a reduced diameter inner second annular wall 24 forming a fluid passage, these walls being interconnected by an intervening radial wall 25 which forms a frusto-conical seal seat for the tube 11 in a manner to be described. The annular wall 23 may be tapered at its leading edge, as shown, to facilitate insertion therein of the plug element of the connector 10, to be described, and to effect spreading of the legs of the spring retainer 14, also to be described in detail hereinafter.

The adapter 12 is provided intermediate its head 21 and its socket end 22 with an annular groove 26 on its outer peripheral surface to receive the legs of the spring retainer 14, to be described.

Referring now to the connector 10, it includes a connector body means having a countersunk bored opening therethrough to provide at one end thereof a cavity as enclosed by a collar 30 portion encircling an annular plug 31 in spaced apart relation relative thereto and concentric therewith, the plug 31 and collar 30 being interconnected by a rear connector body portion 32, the body portion 32 and the plug 31 having a continuous straight bore 33 therethrough of a diameter to slidably receive the tube 11. It should be realized that each of the above identified elements of the connector may be formed as separate elements suitably secured to each other to form a unitary structure or, as shown, the connector may be formed as a one-piece structure made of a suitable material, such as metal, or molded using a suitable plastic material, such as for example Nylon.

Thus, in the embodiment illustrated in FIGS. 1, 2 and 3, the connector 10 is provided, in effect, with a countersunk bored opening extending from and forming its collar end, with the straight bore 33 thereof concentric with the collar 30, the countersunk bored opening defining in sequence an annular inner peripheral wall 34 of the collar 30 having a diameter slightly greater than the outside diameter of the socket end 22 of the adapter 12 whereby this end of the connector can slidably encircle the socket end of the adapter, a radially inward extending annular wall 35 terminating at the annular outer peripheral surface 36 of the plug 31, this outer peripheral surface 36 of the plug 31 extending a predetermined axial distance in a direction back toward the collar end of the connector to terminate at a radial inward extending end wall 37 of the plug 31. The outside diameter of the outer peripheral surface 36 of the plug is sized so as to be slidably received in the inner annular wall 23 of the adapter 12.

The outer peripheral surface of the connector 10, and specifically the outer peripheral surface of the collar 30 thereof, is provided with a pair of diametrically opposed through slots 38 therethrough to receive the spring retainer 14, the slots 38 being axially located on the connector 10 so as to be in alignment with the annular groove 26 in the adapter 12 when the plug 31 of the connector 10 is fully inserted into the socket of the adapter 12.

The tube 11, which may be of any suitable material and, in one construction, is a plastic tube made of Nylon having a nominal outside diameter of 0.122 inch and an inside diameter of 0.075 inch, is slidably received through the bore 33 in the connector 10. The end of the tube 11 inboard of the connector, the end extending outward from the annular plug 31 into the cavity provided by collar 30, is provided with an upset enlarged head or annular bead, providing in the construction shown an annular rim 41 having an outside diameter slightly smaller than the inside diameter of the wall 23 of the socket in the adapter 12, a rearward radial extending, annular flange 42, and at its free end, providing a frusto-conical end surface 43 of a configuration corresponding to the inclined radial wall 25 forming the frusto-conical seat in the adapter 12.

The tapered surface 42 is provided to add strength to the upset end of tube 11 while accommodating the flow of tube material during the process of upsetting of the bead and it, of course, facilitates entry of the bead end of the tube into the opening defined by annular wall 24.

In the construction illustrated using a tube made of Nylon plastic material, since such tubing as is commercially available does not have a uniform outside diameter, during the formation of the upset bead on the end of the tube, the outside diameter of the tube 11 next adjacent to the flange 42 of the bead is properly sized to a uniform, predetermined outside diameter whereby to receive an O-ring seal 45 that is positioned to encircle the tube 11 next adjacent to its annular upset bead. Thus, for example, using the above described Nylon plastic tube 11 having a nominal outside diameter of 0.122 inch, the portion of the tube next adjacent to the flange 42 of the upset bead thereon was sized to a uniform diameter, for example, of 0.125 inch for an axial length of 0.25 inch.

In the coupled assembly position of the connector 10, adapter 12 and tube 11, the position shown in FIG. 2, the O-ring seal 45 encircling the tube 11 is compressed between the outer peripheral surface of the tube 11 and the inner peripheral wall 23 of the socket opening in the adapter 12 and is positioned between the flange 42 of the upset bead of the tube and the wall 37 of the connector 10 whereby this seal is operative as a dynamic or active seal.

The connector 10 and the adapter 12 are releasably retained in the above described coupled assembly position by means of the spring retainer 14 which is normally carried by the connector 10. The spring retainer 14, in the construction illustrated, is in the form of a clip having spaced apart leg portions 50 and 51 that extend through the slots 38 in the connector 10 in position to yieldingly engage into the annular groove 26 in the adapter 12 whereby to effect axial retention of these elements. Thus, the spring retainer 14, formed of round spring wire, includes a single loop 52 with crossing arms 53 and 54, comprising straight portions extending substantially tangentially from the loop 52 in opposite directions from the point where the loop is completed, the crossing arms 53 and 54 being connected to one end of the retainer legs 50 and 51, respectively, so that these legs 50 and 51, in the as formed condition of the retainer, are substantially parallel to each other and, in effect, are hinged together through the arms 53, 54 and the interconnecting loop 52. At their opposite ends, the legs 50 and 51 are joined to crossing straight arm portions 55 and 56, respectively, and these latter arms themselves terminate in spaced apart distal ends 57 and 58, respectively. The distal ends 57 and 58 are positioned so as to be either gripped manually or by a pair of pliers whereby these distal ends 57 and 58 can be forced toward each other, so as to cause the legs 50 and 51 to spread apart whereby these legs can be released from the annular groove 26 in the adapter 12 to permit separation or disconnection of the connector 10 from adapter 12.

It is to be realized that the extent between the set of arms 53 and 54 and the set of arms 55 and 56 is sufficiently larger than the outside diameter of the collar portion 30 of connector 10 whereby to permit the legs 50 and 51 to extend through the slots 38 in chordal respect relative to the collar 30. As shown, the outer periphery of the socket end 22 of the adapter 12 is provided with a conical ramp surface 22a adjacent its free or leading end to effect expansion or spreading apart of the legs 50, 51 during assembly of the connector 10 to the adapter 12 whereby the spring legs will ride up over the outer peripheral surface of adapter 12 to then drop into the annular groove 26 therein.

Figure 4:
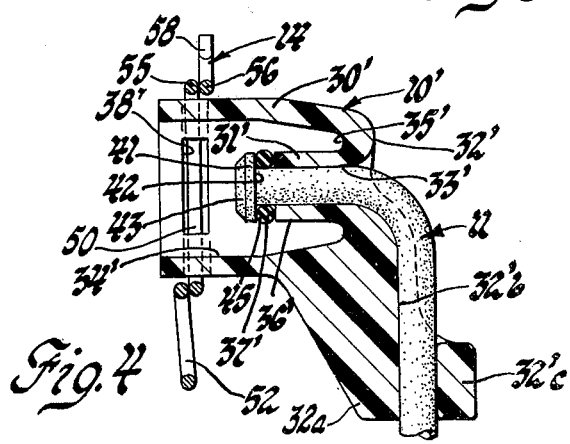
FIG. 4 is a sectional view to a different scale of an alternate embodiment of the connector portion of a quick connect coupling in accordance with the invention; and, FIG. 5 is a perspective view of the alternate embodiment of the connector of FIG. 4.
Figure 5:
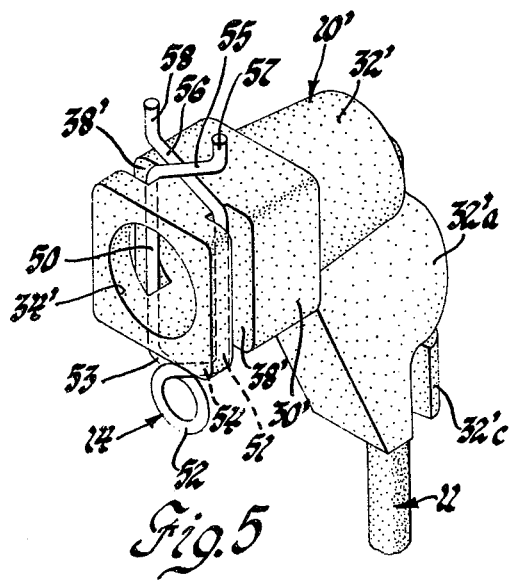

An alternate embodiment of a connector 10' for use in coupling a tube 11 to an adapter 12 is shown in FIGS. 4 and 5, but to a different scale than FIGS. 1, 2 and 3. This connector 10' has means incorporated therein to retain the tube 11 in a predetermined desired tube routing path relative to the adapter 12. This routing path, in the construction illustrated, is a right angle bend departure path from the axis of the bore through the adapter 12.

The connector 10', in the construction illustrated, is provided with a body means which includes a collar 30', of external square sided configuration, that encircles a male plug 31' with these elements being interconnected by a rear connector body portion 32' having a right angle tube routing bracket clip portion 32'a integral therewith. As best seen in FIG. 4, the connector 10', like the connector 10 previously described, is provided with a countersunk bored opening extending from one end thereof defining in sequence an annular inner peripheral wall 34' of the collar 30', a radially inward extending annular wall 35' terminating at the annular outer peripheral surface 36' of the male plug 31', the outer peripheral surface 36' of the male plug extending a predetermined axial distance in a direction back toward the collar end of the connector to terminate at a radially inward extending end wall 37'. The diameter of the peripheral surface 36′ will of course correspond to the inside diameter of the socket in the adapter 12 so as to be slidably received therein. In addition, the straight bore 33′ portion of the countersunk bored opening in the connector 10′ extends from the end wall 37′ of the male plug 31 through the rear connector body portion 32′ and, a portion of this bore 33′ in the rear connector body portion 32′ is coterminous with a tube slot 32′b, semi-circular in cross section, formed in the outer surface in the rear of the bracket clip portion 32′a, whereby to provide a continuous guide path for the tube 11 to provide a right angle departure path for the tube 11 relative to the axis of the bore in the adapter 12. In addition, the bracket clip portion 32′a of the connector is provided with a slotted hose retaining bracket clip 32′c aligned with the tube slot 32′b into which the tube may be releasably clipped for retention thereby after it is bent into the right angle departure path shown in FIG. 4, whereby the tube 11 is thus retained in the tube slot 32′b. Although the tube slot 32′b is shown as being formed at right angle to the axis of the bore 33′, it should be realized that this tube slot could be formed at any desired departure angle relative to the axis of the bore 33′.

As shown in FIG. 4, the tube 11 in the connector 10′ is provided with an upset bead to seat against the inboard end of the socket in an adapter 12, as previously described, and an O-ring seal 45 encircles the tube 11 between the annular flange 42 provided by the upset bead at the end of the tube and the end wall 37′, the O-ring seal 45 being shown in FIG. 4 in its un-compressed condition.

The collar portion 30′ of the connector 10′ is provided with through slots 38′ in opposite walls of the collar portion 30′ which extends through its inner peripheral wall 34′, these slots being of a suitable width whereby to receive the legs 50 and 51 of a spring retainer 14, whereby the connector 10′ can be releasably coupled to an adapter 12 in the manner previously described.

What is claimed is:

1. A quick connect coupling comprising in combination an adapter of tubular configuration having a stepped cylindrical opening therethrough defining at one end thereof a socket, a connector having body means at one end thereof defining an annular collar encircling a tubular plug and forming therewith a cavity to slidably receive one end of said adapter with said tubular plug slidably received in said socket of said adapter, a flexible tube slidably received by said tubular plug, said tube having an upset annular bead at one end thereof extending axially outward of said tubular plug in position to be encircled by said collar and receivable in said socket, an annular seal ring encircling said tube between said upset bead and the end of said tubular plug enclosed by said collar, said annular seal ring, when inserted into said socket, being radially compressed between an inner peripheral wall of said socket and the outer peripheral surface of said tube, said collar of said connector having diametrically opposed slots extending therethrough, said adapter having an annular groove on the outer peripheral surface thereof aligned with said slots in said connector when said connector is fully coupled relative to said adapter and, a spring retainer means encircling said connector, said spring retainer means having spaced apart leg portions loosely received in said slots for yielding engagement in said annular groove of said adapter.

2. A quick connect coupling including an adapter having a stepped cylindrical opening therethrough and defining at one end thereof a socket having an annular inner peripheral socket wall terminating at a radial inward extending inclined annular seal shoulder, said adapter having an annular recessed groove on the outer periphery thereof intermediate its ends, a connector having a countersunk bored opening therethrough providing at one end thereof an adapter coupling collar as defined by an enlarged bore portion of said bored opening extending a predetermined axial length from said one end of said connector, said countersunk bored opening defining in sequence an annular inner peripheral wall means of said adapter coupling collar, said peripheral wall means being of a diameter to slidably receive said one end of said adapter, a radial annular wall extending inward from said peripheral wall means to terminate at the exterior peripheral surface of a tubular male plug portion of said connector concentric with said inner peripheral wall means and extending axially a predetermined distance in a direction back toward said one end of said connector, said male plug being slidably received by said socket wall of said adapter, said connector having a pair of spaced apart radial slots through said adapter coupling collar, said radial slots being aligned with said recessed groove in said adapter when said male plug is fully inserted into said socket wall, a tube having an annular radial upset bead at one end thereof with a frusto-conical surface at its free end of a shape complementary to said stop shoulder, said tube being slidably received within said tubular male plug of said connector with said upset bead positioned to abut against said annular seal shoulder of said adapter when said connector and said adapter are coupled together, an annular seal ring encircling said tube between said upset bead and the free end of said male plug in position to be radially compressed between said inner peripheral socket wall and the outer peripheral surface of said tube when said male plug is inserted into said socket and, a spring retainer means partly encircling said connector and having spaced apart movable spring legs extending through said slots in said connector to be in position to engage said recessed groove in said adapter whereby to releasably secure said connector and said adapter together when in fully mated relationship to each other.

* * * * *